United States Patent
Baskin

(10) Patent No.: US 7,031,727 B2
(45) Date of Patent: Apr. 18, 2006

(54) METHOD OF LOCATION USING SIGNALS OF UNKNOWN ORIGIN

(76) Inventor: Brian L. Baskin, 1604 Villarita Dr., Campbell, CA (US) 95008

(*) Notice: Subject to any disclaimer, the term of this patent is extended or adjusted under 35 U.S.C. 154(b) by 56 days.

(21) Appl. No.: 10/686,122

(22) Filed: Oct. 14, 2003

(65) Prior Publication Data

US 2005/0079876 A1    Apr. 14, 2005

(51) Int. Cl.
*H04Q 7/00*    (2006.01)

(52) U.S. Cl. .............. 455/456.2; 455/456.5; 455/404.2; 342/357.02

(58) Field of Classification Search ........... 455/456.1, 455/456.2, 456.5, 456.6, 39, 67.11; 342/42, 342/44, 453, 357.02; 370/346, 324

See application file for complete search history.

(56) References Cited

U.S. PATENT DOCUMENTS

| | | | | |
|---|---|---|---|---|
| 5,815,814 A | * | 9/1998 | Dennison et al. | 455/456.2 |
| 5,969,679 A | * | 10/1999 | Bolliger et al. | 342/464 |
| 6,249,680 B1 | * | 6/2001 | Wax et al. | 455/456.2 |
| 6,266,534 B1 | * | 7/2001 | Raith et al. | 342/357.02 |
| 6,356,763 B1 | * | 3/2002 | Kangas et al. | 455/456.1 |
| 6,784,827 B1 | | 8/2004 | Hirt | |
| 6,785,321 B1 | * | 8/2004 | Yang et al. | 342/357.01 |
| 2003/0052821 A1 | | 3/2003 | Holt | |
| 2003/0174086 A1 | | 9/2003 | Hirt | |
| 2004/0021566 A1 | * | 2/2004 | Hayashi et al. | 340/539.13 |

* cited by examiner

*Primary Examiner*—Joseph Feild
*Assistant Examiner*—Kamran Afshar
(74) *Attorney, Agent, or Firm*—Stanley Z Cole

(57) ABSTRACT

The present invention encompasses a method of location comprising: using a plurality of signal receivers to receive one or more multiple frequency input signals, wherein said multiple frequency input signals are of unknown origin, and said signal receivers are of known physical location, finding a difference in time of the reception of the signals between each of the signal receivers, using the difference in time of reception to locate the origin of the signals, utilizing the signals locate a signal receiver of unknown location.

12 Claims, 4 Drawing Sheets

METHOD OF LOCATION USING SIGNALS OF UNKNOWN ORIGIN

BACKGROUND OF INVENTION

1. Field of Invention

This invention relates generally to global positioning systems (GPS) and, in particular, GPS systems used for emergency location of cellular handsets.

2. Description of Related Art

Various methods have been put forth in order to address the need for an emergency cellular location system. One method utilizes a number of cell transmission towers to locate a cell phone user by standard triangulation methods. This method is limited due to the low level of handset power in that it is unlikely that three or more towers will receive the signal needed for triangulation. Another method utilizes the GPS system, whereby a GPS receiver is located in the cell handset. Like the cell-tower system, this method is limited because of the lack of transmitted power, but also due to the distance of the satellite mounted transmitters from the handset receiver.

SUMMARY OF INVENTION

A unique method is introduced herein, whereby local signals are utilized to locate an unknown-location signal receiver. In this method, three or more known-location signal receivers are used to locate one or more unknown-location transmitters of signals of greater than zero bandwidth by way of delay differentiation. A combination of three or more signal transmitters comprising one or more unknown-location transmitters are then utilized to locate the unknown-location signal receiver.

In one embodiment, three or more standard television and radio signals are located using three or more cell sites and, with timing referenced to the signals received by the cell sites, a cellular handset is located. In another embodiment, the delay from one or more cell sites to the hand set is utilized, along with one or more unknown-location receiver to locate the cellular handset. A third embodiment utilizes mobile transmitters, such as emergency or police band radios to locate and utilize for handset location. A fourth embodiment utilizes other cellular handsets in order to locate a cellular handset. The preferred embodiment employs all four of these means to locate a cellular handset.

One method introduced herein comprises 1) measuring the difference of delay from one or more unknown-location signal transmitters to three or more known-location signal receivers. 2) utilizing said delay difference measurements to locate the one or more unknown-location signal transmitters. 3) locating an unknown-location signal receiver by way of a combination of three or more signal transmitters comprising one or more unknown-location transmitter.

DETAILED DESCRIPTION OF THE INVENTION

In the first embodiment, a remote processing station sends a request to three or more known-location signal receivers to send return signals in order to measure the delay from each known-location signal receiver to the processing station. Each known-location signal receiver receives signals from three or more unknown-location transmitters and sends the signals from the unknown-location transmitters to the remote processing station. The processing station then measures the difference in time between the signals received by the known-location signal receivers from each unknown-location transmitter by subtracting the respective transmission line delays. The net delay differences from each unknown-location transmitter to each of the known-location signal receivers are used to locate each unknown-location transmitter at a point in space.

Figure 1:
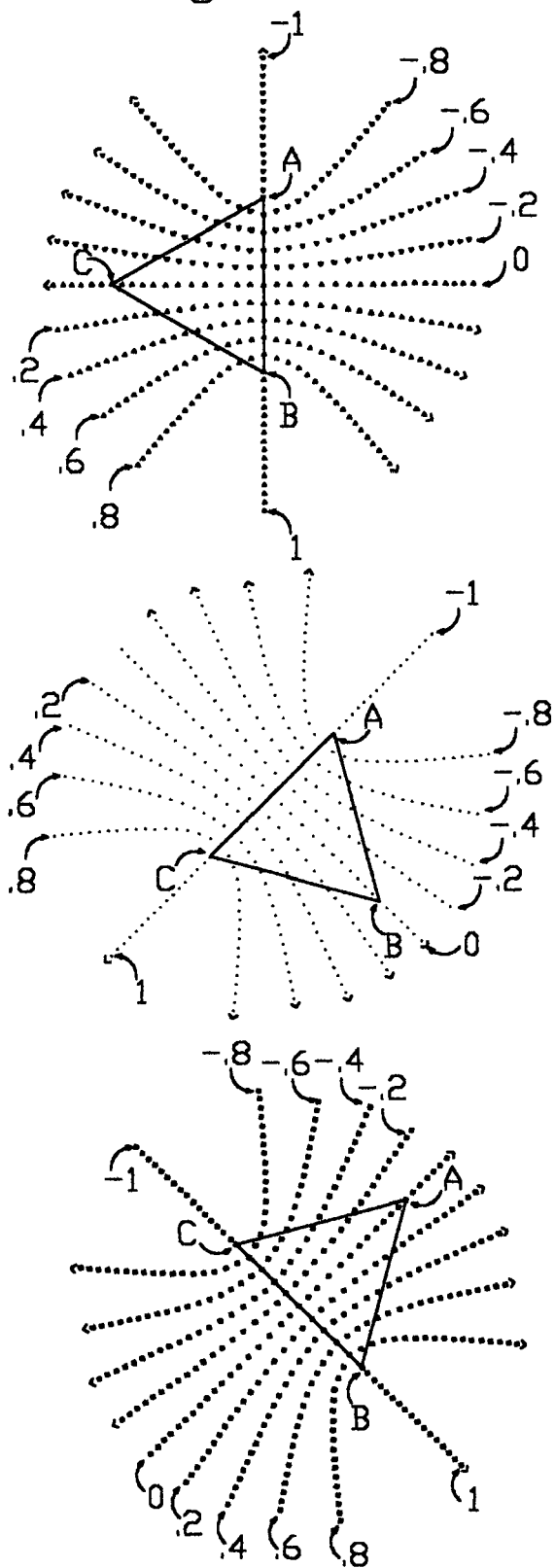
FIG. 1 shows the constellation of possible locations using known-location signal receivers AB, AC, and BC for various differences in time with respect to the transmission time from a first known-location signal receiver to a second known-location signal receiver.

FIG. 1 shows the constellation of possible locations using known-location signal receivers AB, AC, and BC for various differences in time with respect to the transmission time from a first known-location signal receiver to a second known-location signal receiver. As an example, the constellation labeled 0.8 is represents a set of points where the transmission time from any point on the arc to point A is equal to the transmission time to point B plus 80% of the transmission time from point A to point B.

Figure 2:
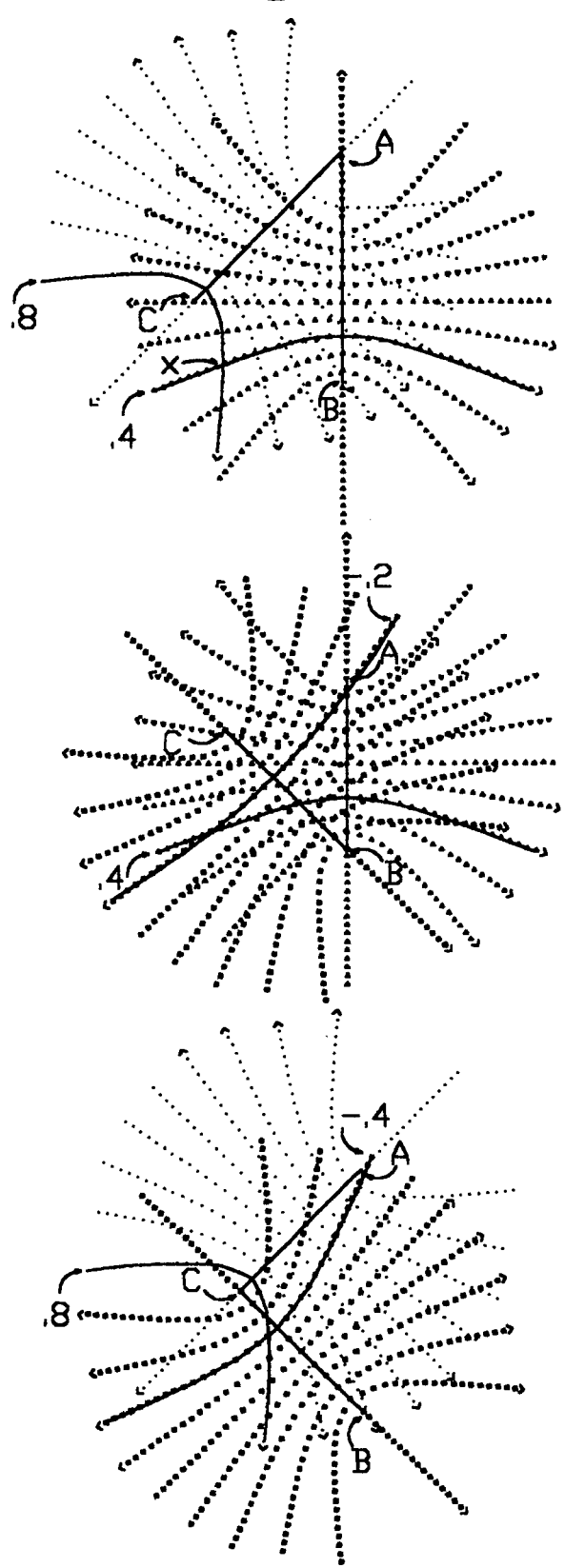
FIG. 2 shows the location of a specific point (x) using any two of the vector sets.

FIG. 2 shows the location of a specific point (x) using any two of the vector sets. Using vector sets AB and AC, the constellations 0.4 and 0.8 cross to locate point (x). Using vector sets AB and BC, the constellations 0.4 and −0.2 cross to locate point (x). Using vector sets AC and BC, the constellations 0.8 and −0.4 cross to locate point (x).

Figure 3:
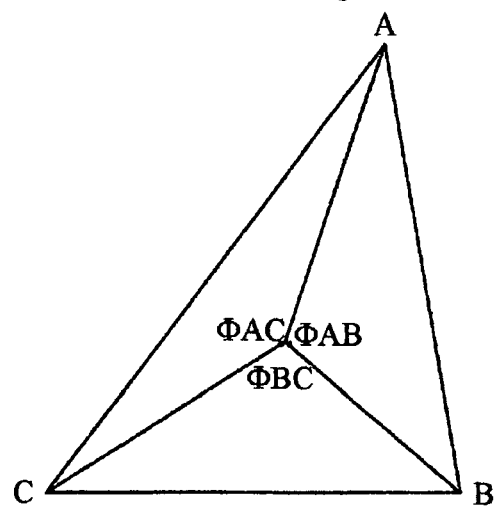
FIG. 3 shows a point (x) located within three points A, B, and C.

FIG. 3 shows a point (x) located within three points A, B, and C. A mathematical representation follows:

$$(AB)^2 = (Z_a)^2 + (Z_a-b)^2 - 2(Z_a)(Z_a-b)\cos(\phi_{AB})$$

$$(AC)^2 = (Z_a)^2 + (Z_a-c)^2 - 2(Z_a)(Z_a-c)\cos(\phi_{AC})$$

$$(BC)^2 = (Z_a-b)^2 + (Z_a-c)^2 - 2(Z_a-b)(Z_a-c)\cos(2\pi-\phi_{AB}-\phi_{AC})$$

Where $Z_a$ represents the delay from (x) to A, and b and c represent the difference in delay from (x) to B and C with respect to the distance from (x) to A.

$Z_a$, $\phi_{AB}$, and $\phi_{AC}$ are unknowns, they can be found mathematically or by iteration with the three independent equations shown above. With the three variables known, the x and y coordinates of the transmitter (x) can be found.

Figure 4:
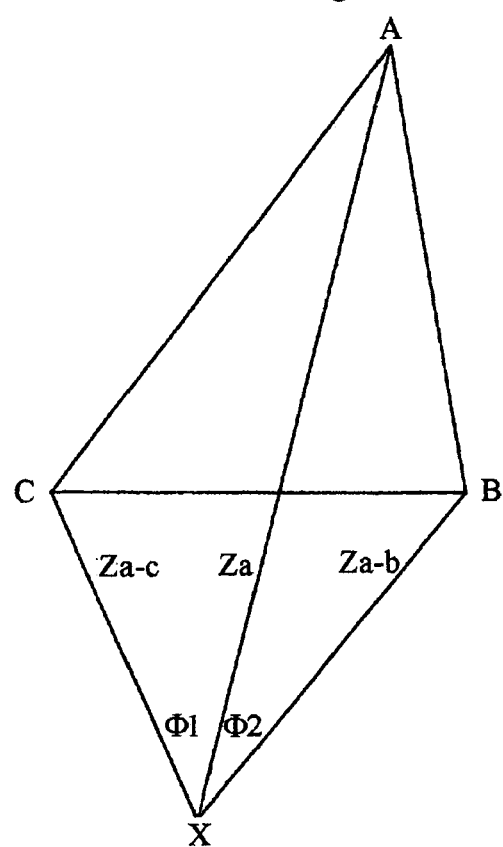
FIG. 4 shows a point (x) located outside three points A, B, and C.

FIG. 4 shows a point (x) located outside three points A, B, and C. A mathematical representation follows:

$$(AB)^2=(Z_a)^2+(Z_a-b)^2-2(Z_a)(Z_a-b)\cos(\phi_1)$$

$$(AC)^2=(Z_a)^2+(Z_a-c)^2-2(AC)(Z_a-c)\cos(\phi_2)$$

$$(BC)^2=(Z_a-b)^2+(Z_a-c)^2-2(Z_a-b)(Z_a-c)\cos(\phi_1+\phi_2)$$

Again, $Z_a$ represents the delay from (x) to A, and b and c represent the difference in delay from (x) to B and C with respect to the distance from (x) to A.

$Z_a$, $\phi_1$, and $\phi_2$ are unknowns, they can be found mathematically or by iteration with the three independent equations shown above. With the three variables known, the x and y coordinates of the transmitter (x) can be found.

The remote processing station sends a request to an unknown-location signal receiver, either directly or by way of one of the known-location signal receivers, to send a return signal in order to measure the delay from the unknown-location signal receiver to the processing station.

The unknown-location signal receiver receives the signals from the three or more unknown-location transmitters and sends the signals from the unknown-location transmitters to the remote processing station.

The processing station then measures the delay from each of the three or more unknown-location signal transmitters to the processing station, by way of the unknown-location signal receiver and finds the delay from the unknown-location signal transmitters to the unknown-location signal receiver by comparing the signal received by the unknown-location signal receiver and the signal received by any one of the three or more known-location signal receivers and by subtracting the delay from the unknown-location signal receiver to the processing station.

With each of the points of transmission known, the signal delay from each point of transmission to the unknown-location signal receiver known, standard triangulation methods can be used to find the unknown-location signal receiver.

In other words, the location of the unknown-location signal receiver is calculated by measuring the difference of reception in time of three or more independent signals to each of the known-location signal receivers and to the unknown-location signal receiver.

In a second embodiment, the location of the unknown-location transmitters is as described in the first embodiment. A second method of location of the unknown-location receiver is described herein.

In the second embodiment, the remote processing station sends a request to an unknown-location signal receiver, by way of one or more of the known-location signal receivers, to send a return signal in order to measure the delay from the unknown-location signal receiver to said one or more of the known-location signal receivers in order to measure the delay from the unknown-location signal receiver to the one or more of the known-location signal receivers.

The unknown-location signal receiver receives the signals from one or more unknown-location transmitters and sends part or all of the signals from the unknown-location transmitters to the remote processing station, by way of the one or more of the known-location signal receivers.

The processing station then measures the delay from each of the one or more unknown-location signal transmitters to the processing station, by way of the unknown-location signal receiver and finds the delay from the unknown-location signal transmitters to the unknown-location signal receiver by comparing the signal received by the unknown-location signal receiver and the signal received by any one of the three or more known-location signal receivers and by subtracting the delay from the unknown-location signal receiver to the processing station.

With each of the points of transmission known, the signal delay from each point of transmission to the unknown-location signal receiver known, and the delay from the unknown-location signal receiver to the one or more of the known-location signal receivers known, any combination of the one or more of the known-location signal receivers and the one or more unknown-location signal transmitters is utilized in standard triangulation methods to find the unknown-location signal receiver.

In a third embodiment, mobile transmitters, such as police band radios are located using a similar method as in the first embodiment. In this method, however, the reception of signals must be time marked as they arrive at the processing station since the location of the transmitter is constantly changing. Location of the unknown-location receiver is as with the first or second method introduced herein.

In a fourth embodiment, three known-location transceivers, in combination with other unknown-location receivers are used to locate the first unknown-location receiver. Because cellular hand sets, regardless of whether or not in use, are in communication with nearby cell sites, and hand sets within the same cell communicate at different frequencies, each handset in the cell can be used as a repeater.

Figure 5:
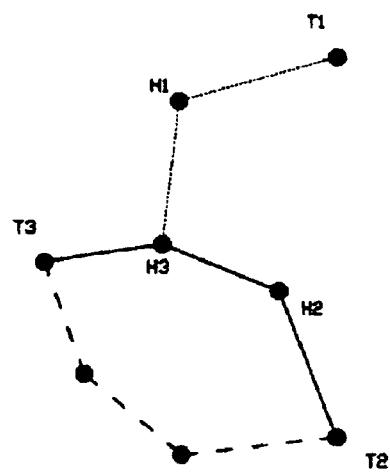
FIG. 5 shows three cell towers (T1,T2,T3) and three cellular handsets (H1,H2,H3).

FIG. 5 shows three cell towers (T1,T2,T3) and three cellular handsets (H1,H2,H3). The processing station pings each handset in order to find the delay between the handset and the corresponding tower and the delay from each tower to the processing station. If an adjacent handset receives the return signal from its neighboring handset, the delay between the two handsets is used for location. In other words, adjacent handsets are used as repeaters.

As an example, if H3 receives the return signal from H2, the delay can be found between H2 and H3 providing that the communication between each handset and its corresponding tower are at different frequencies, because the processor is aware of when the signal was sent to H2 and the delays between the handsets and corresponding towers are known. Two possibilities for location of both H2 and H3 are indicated. If H1 is able to receive the return signal from H2 or H3, triangulation to H2 and H3 is possible.

Figure 6:
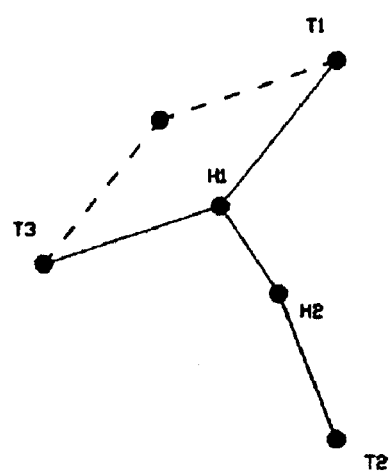
FIG. 6 shows another method wherein a first handset receives signals from two towers and a second handset receives a signal from a third tower.

FIG. 6 shows another method wherein a first handset receives signals from two towers and a second handset receives a signal from a third tower. Pinging of the first handset by the corresponding towers reveals two possibilities for location, communication between handsets reveals the true location of both handsets.

Figure 7:
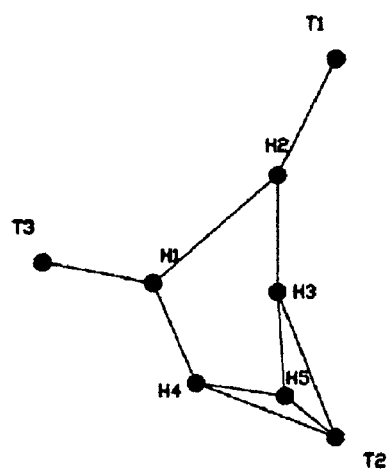
FIG. 7 shows multiple handsets used to indirectly locate a handset, whereby location of the handset to be found can be accomplished by locating other handsets within the cell, an then using the other handsets as known-location transmitters.

FIG. 7 shows multiple handsets used to indirectly locate a handset, whereby location of the handset to be found can be accomplished by locating other handsets within the cell, an then using the other handsets as known-location transmitters. Although H5 has no communication with H1 and H2, communication with H3 and H4 is possible. With the delays between T1 and H1, T2 and H2, H1 and H4, H3 and H5, T2 and H3, T2 and H4 known, H1 through H4 can be located and used to find H5.

In the preferred embodiment, the four methods described above are utilized to locate a cell handset. In this embodiment, the remote processor pings three or more cell sites in order to find the delay between the sites and the processing station. Receivers attached to the cell sites scan the area in order to find local transmitters and other handsets. The remote processor then locates the any transmitters by way of the method described in method one herein. The remote processor then pings the cell handset to be located in order to find the delay from the handset to any cell sites in which the handset is communicating. The cell handset, which contains a similar receiver as the cell sites, along with one or more cell sites, is instructed to receive one or more of the transmitters found so that an approximation can be made regarding the location of the handset. Once an approximate location is found, The remote processor then instructs cell sites near the transmitters to accurately locate the located transmitters. The processor also makes an evaluation of transmitter location accuracy based on the distance from the cell sites used to locate the transmitter to the corresponding transmitter and based on how optimum the cell sites are located around the transmitter. Based on this accuracy, the remote processor selects the transmitters which will provide the highest accuracy of handset location. If this selection comprises a nearby cell handset, the nearby handset and any cell towers in communication with the nearby handset are instructed to find the delay from each of the towers in communication with the nearby handset and to use the nearby handset as a signal repeater. If a mobile transmitter is to be utilized, the processor time stamps the delay information to account for a varying location.

Any combination of location methods described herein are utilized to locate the cell handset. The process continuously repeats to find new, more optimum transmitters. As an example, an emergency vehicle radio would likely become a transmitter as it approaches the handset.

The invention claimed is:

1. A method of locating at a central processor a signal receiver comprising
   using four signal receivers each at a different location to receive a plurality of multiple frequency input signals originating from an unknown origin transmitter, wherein said signal receivers are of known physical location except for one which is at an unknown location,
   finding a difference in time of the reception at the central processor of said signals from said transmitter and between each of the signal receivers,
   using the differences in time of reception at said signal receivers of known location to locate the origin of said signals from said transmitter, and
   using the known location of three sites and the differences in time of reception from the transmitter to at least two signal receivers at known locations and the signal receiver at the unknown location, and determining the location of said signal receiver at said unknown location.

2. The method of claim 1, whereby said signal receivers at known locations are cellular base stations and said signal receiver at the unknown location is a cellular handset.

3. A signal receiver locating system including a central signal processor comprising:
   a plurality of signal transmitters, each positioned at an unknown location,
   three or more known location signal receivers,
   an additional signal receiver at an unknown location,
   said known location signal receivers and said additional signal receiver receiving signals from said signal transmitters,
   said central signal processor receiving signals from said signal receivers and outputting a set of data, whereby said data is used to locate said signal transmitters and thereafter using information from three known sites to locate said additional signal receiver.

4. The method of claim 3 whereby said signal receivers at known locations are cellular base stations and said unknown location signal receiver is a cellular handset.

5. The method of determining at a central processing station the location of a cell phone at an unknown location using three cell sites, each at a known location, comprising
   receiving signals from at least one transmitter at an unknown location at each of said cell sites and to the cell phone,
   causing each of said cell sites and said cell phone to send to said central processing station a representation of said signals from said at least one transmitter,
   measuring at said central processing station the difference in time delays to said cell sites and said cell phone of signals received at said cell sites and said cell phone from said at least one transmitter,
   using said difference in time delay measurement to locate said at least one transmitter, and,
   locating said cell phone using three known locations selected from the locations of said cell sites, and said at least one transmitter.

6. The method of locating at a central processing station a cell phone at an unknown location using at least three cellular base station sites, each at a known location, comprising
   receiving signals from at least one transmitter at an unknown location at each of said three cellular base sites and said cell phone causing each of said cellular sites and said cell phone to send data of said signals from said at least one transmitter to said processing station,
   measuring the difference in time delays to said cellular sites and said cell phone at said processing station of signals received at said cellular sites and said cell phone from said at least one transmitter and at said processing station locating said at least one transmitters, and,
   then using three known locations from the known locations of said at least one transmitter and said three cellar base stations, locating said cell phone.

7. A signal transceiver locating system comprising,
   a central processing station,
   three or more signal transceivers at sites at known locations,
   an additional signal transceiver at an unknown location, and
   at least one power transmitter at an unknown location adapted to send signals to each of said signal transceivers,
   said central processor adapted to receive signals from said signal transceivers and based on time delay information received in said signals determine the location of said unknown at least one power transmitter, and
   based on the information in said signals and based on the knowledge of the location of said at least one transmitter, determine the location of said additional signal transceiver employing the information available for at least three known sites.

8. A signal transceiver locating system in accordance with claim 7 in which said three or more signal transceivers at sites at known locations comprise cellular base stations.

9. A signal transceiver locating system in accordance with claim 7 in which said signal transceiver initially at the unknown location comprises a cellular phone handset.

10. A method of locating at a central processor a first signal transceiver located at an unknown location, comprising transmitting multiple frequency signals from at least one transmitter at an unknown location;

receiving at and transmitting signals from at least three transceivers each at a known location said signals from said at least one transmitter;

determining at said central processor the difference of arrival times at said transceivers from data representing the transmitted signals sent by said transceivers to said central processor;

determining the location of said at least one transmitter using three known locations of transceivers and the differences in arrival times of signals from said at least one transmitter;

determining the location of said first signal transceiver from differences in arrival times of said signal using three known locations from the group of known locations of transceivers and said at least one transmitter.

11. The method of claim 10 in which said three signal transceivers at a known location are cellular base stations.

12. The method of claim 11 in which said first signal transceiver comprises a cellular handset.

* * * * *